Feb. 2, 1932. W. R. COLLINGS 1,843,760
METHOD OF SEPARATING MAGNESIUM AND CALCIUM CHLORIDES
Filed Jan. 31, 1928
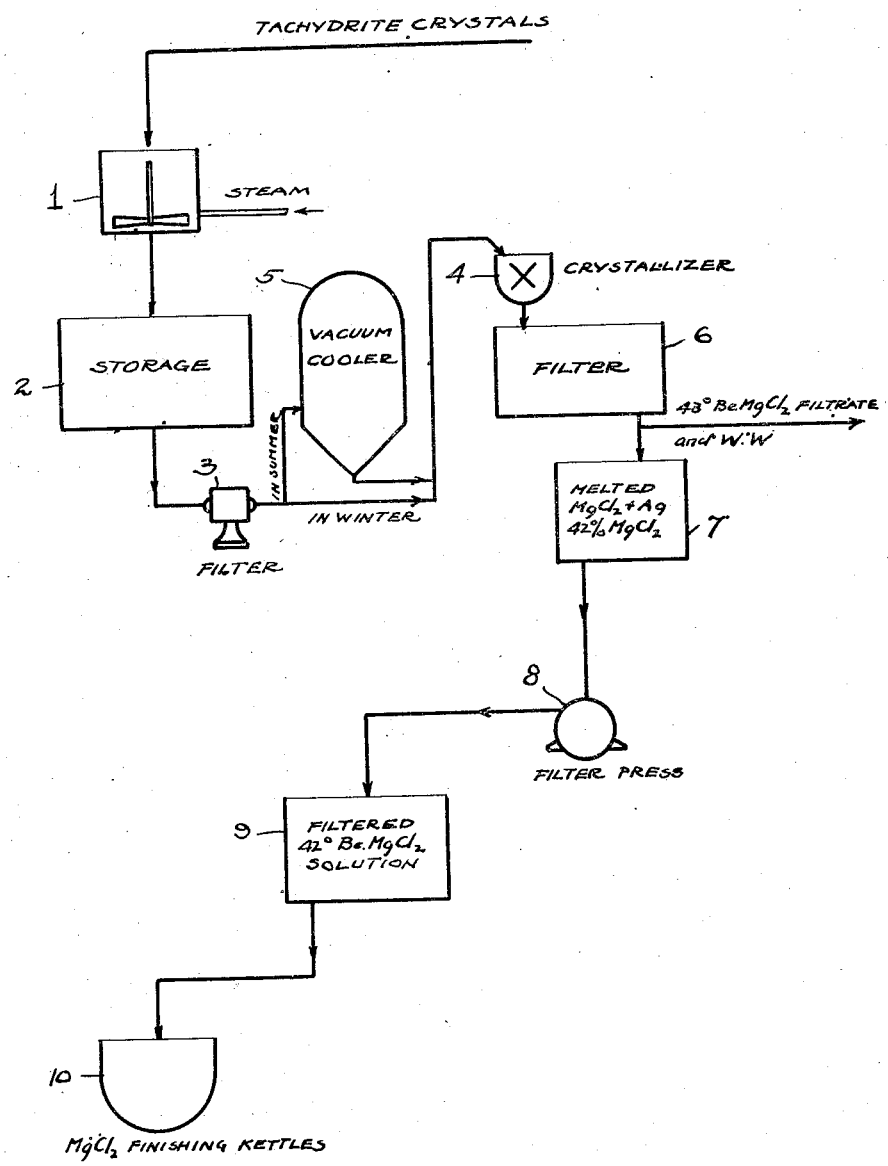

Patented Feb. 2, 1932

1,843,760

UNITED STATES PATENT OFFICE

WILLIAM R. COLLINGS, OF MIDLAND, MICHIGAN, ASSIGNOR TO THE DOW CHEMICAL COMPANY, OF MIDLAND, MICHIGAN, A CORPORATION OF MICHIGAN

METHOD OF SEPARATING MAGNESIUM AND CALCIUM CHLORIDES

Application filed January 31, 1928. Serial No. 250,822.

In United States Letters Patent No. 1,627,068 to A. K. Smith and C. F. Prutton, dated May 3, 1927, there is disclosed an improved method or process for treating brines which contain calcium and magnesium chlorides, with the object of separating the latter from each other. Incidentally to such process the calcium and magnesium chlorides, at least in part, are crystallized out of the solution in the form of a double salt known as tachydrite ($CaCl_2.2MgCl_2.12H_2O$). These crystals are then separated from the mother liquor and by appropriate treatment the calcium chloride content may be separated from the magnesium chloride and the latter purified.

According to the process as described and claimed in the aforesaid Letters Patent, the separation of calcium chloride from the tachydrite is accomplished by agitating the latter with a limited quantity of water at regulated temperature to dissolve such calcium chloride constituent and leave magnesium chloride crystals behind. Specifically the tachydrite crystals are mixed with about 25 per cent. of water by weight and agitated in the form of a thick slurry for approximately an hour at a temperature which should not fall below 22 degrees C. nor rise above 50 degrees C. Under these conditions the water will cause the calcium chloride of the tachydrite to dissolve and leave crystals and adhering mother liquor containing 42 per cent. magnesium chloride and 5 per cent. calcium chloride, the remainder being water.

We have now discovered another, and as we regard the same a superior, method for thus separating calcium chloride from tachydrite or, conversely stated, for separating magnesium chloride from its admixture with calcium chloride in the form of tachydrite or in equivalent molecular ratio. Briefly stated, the present improved procedure involves dissolving the tachydrite in a limited amount of water, using heat to produce a solution which when cooled to the proper temperature will crystallize out magnesium chloride in hexahydrate form ($MgCl_2.6H_2O$), the calcium chloride being retained in solution.

More particularly the invention consists of the steps hereinafter fully described and particularly pointed out in the claims, the annexed drawing and the following description illustrating and setting forth in detail certain steps embodying the invention, such disclosed means constituting, however, but several of the ways in which the principle of the invention may be used.

In said annexed drawing:—

The single figure there appearing is a diagrammatic representation on the order of a flow sheet illustrating the apparatus and steps employed in carrying out the present improved process.

So far as the present process is concerned, it is of course a matter of indifference from what source or in what manner the tachydrite employed therein is derived. In other words, it need not necessarily be obtained from the natural brine such as the Midland brine referred to in the aforesaid Patent No. 1,627,068. However, it will be understood that where a natural brine or one containing sodium chloride in addition to the calcium and magnesium chlorides is employed, the sodium chloride will be first salted out by well known means of concentration.

According to the present process, such tachydrite crystals after such preliminary steps, if any be required, as may be deemed necessary to wash or otherwise purify the same, are entirely dissolved in a limited amount of water by the addition of heat, such water being added, at least in part, and the heat being supplied by injecting steam into the mixture, and the temperature being thus raised from 90 degrees to 100 degrees C. However, the amount of water that is added is limited to just enough so that upon cooling the resulting solution to approximately 30 degrees C., all of the calcium chloride will be in the solution and the crystals which thereupon are formed will be magnesium chloride in the hexahydrate form. The magnesium chloride crystals thus obtained after washing contain less than 0.5 per cent. of calcium chloride. By entirely dissolving the crystals opportunity is also given to filter press the solution and thus remove residual impurities such as magnesium hydroxide, $Mg(OH)_2$, ferrous hydroxide, $Fe(OH)_2$, and salt, $NaCl$, which do not entirely dissolve with the crystals. An additional advantage of completely dissolving the crystals is that in this way it is easy to get a representative sample of the mixture and thus more accurately adjust the strength of the solution so that practically all of the calcium chloride will be retained in solution upon cooling.

By way of a more detailed description of the procedure and having reference to the attached drawing, the tachydrite, from whatever source derived and after being washed to remove as far as possible adherent impurities from the mother liquor, is dissolved in a suitable apparatus 1 and the solution run into a storage tank 2. From the latter it is withdrawn as required for use in the process through a filter press 3 from which it is carried to a crystallizer 4 where it is cooled to separate out magnesium chloride hexahydrate. In summer time the solution may be precooled in a vacuum cooler 5 before final cooling in such crystallizer in order to maintain the capacity of the latter, although at winter temperatures the solution may be transferred directly to such crystallizer. The magnesium hexahydrate crystals and mother liquor are received in a filter 6, where, after separation of the mother liquor, the crystals may be further washed, the filtrate and wash water being removed for reconcentration or for use otherwise as desired. The washed crystals from filter 6 are then melted to produce a strong magnesium chloride solution which is stored in a tank 7 whence it is transferred through a filter press 8 to another storage tank 9 and finally to the finishing kettle 10.

The formation of the dissolved tachydrite preliminarily to its storage in tank 1 and the treatment of the solution incidentally to its passage to and through crystallizer 4 constitute the steps of particular interest in the present connection. As previously indicated, such tachydrite is dissolved in a limited amount of water and heated up by blowing steam into the mixture, the apparatus in which this is accomplished consisting preferably of a tank with a suitable stirrer and means for thus injecting steam into its contents. When the temperature of the solution in the tank reaches 90 degrees C., the steam is shut off and the strength of the solution adjusted. An amount of water must be added such that when the solution is cooled, the maximum yield of pure magnesium chloride crystals is obtained. If too much water is added, the yield of magnesium chloride will be reduced, while if too little is added, the calcium chloride will not all be retained in solution but will be crystallized in part along with the magnesium chloride in the form of tachydrite crystals. The condition of the solution can best be measured by cooling a portion of it to 30 degrees C. and separating the liquor from the crystals in a screen funnel. Experience has shown that if the gravity of the filtrate is maintained between 42.5 and 43 degrees Bé., the resulting magnesium chloride will always contain less than 0.5 per cent. and usually less than 0.25 per cent. of calcium chloride after it is washed. Water is then added to the solution until the gravity of the mother liquor is between the above limits.

The filtration received by the solution in passing through filter 6 serves to remove small amounts of dirt, hydrate, iron and residual salt, $NaCl$. Where the vacuum cooler 5 is employed, it usually cools the liquor from about 75 degrees C. to 55 degrees C., thereby raising the gravity of the solution approximately 2 degrees Bé. and in such case the tachydrite solution should be correspondingly adjusted, i. e., to approximately 41 degrees Bé. when such vacuum cooler is in operation. In the crystallizer 4, which is preferably of the Swenson-Walker type, the mixture is cooled to from 25 to 35 degrees C. It is an interesting fact that the crystals which separate out during the first stage of the cooling operation are tachydrite. This takes place until a temperature of about 50 degree C. is reached when magnesium chloride crystals start to separate from the solution. As the cooling proceeds, magnesium chloride crystals continue to separate and the calcium chloride is redissolved from such initially formed tachydrite crystals. It is possible that the latter can be said to redissolve and recrystallize, the calcium remaining in solution while the magnesium chloride crystallizes out.

The process, it should be explained, is not necessarily limited to starting with tachydrite crystals, or tachydrite as such, but the solution obtained therefrom and stored in tank 2, as hereinbefore described, such solution containing magnesium chloride and calcium chloride in approximately the ratio of two molecules of the former to one of the latter, may be taken as the starting point, irrespective of the specific manner in which, or source from which, such solution is derived. In fact, the method is applicable to any solution of magnesium chloride and calcium chloride in which the molecular ratio of magnesium chloride to calcium chloride is greater than approximately one to one, which latter is the ratio of magnesium chloride to calcium chloride in the mother liquor after separation of the magnesium chloride $6H_2O$ crystals.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. The method of separating magnesium chloride from a solution containing such chloride and calcium chloride in a molecular ratio greater than approximately one mole of the former to one of the latter, which comprises adjusting the amount of water present to produce a solution at a temperature materially above 30° C. such that, when cooled to approximately 30 degrees C., the mother liquor remaining from the crystals thereupon formed will have a gravity of beween 42.5 degrees and 43.0 degrees Bé.

2. The method of separating magnesium chloride from a solution containing such chloride and calcium chloride in a molecular ratio greater than approximately one mole of the former to one of the latter which comprises adjusting the amount of water present at a temperature materially above 30° C. to produce a degree of concentration such that when the solution is cooled to approximately 30° C. crystals of $MgCl_2.6H_2O$ will be precipitated and the mother liquor separated from the crystals will have a gravity of between 42.5 and 43.0 degrees Bé., then cooling such solution to approximately 30° C. and filtering off the crystals from the mother liquor containing the two chlorides in approximately equimolecular ratio.

Signed by me, this 28 day of January, 1928.

WILLIAM R. COLLINGS.